United States Patent [19]
Arai et al.

[11] Patent Number: 5,286,766
[45] Date of Patent: Feb. 15, 1994

[54] ROOM TEMPERATURE VULCANIZABLE ORGANOPOLYSILOXANE COMPOSITION AND METHOD FOR PRODUCING THE SAME

[75] Inventors: Masatoshi Arai; Tsuneo Kimura, both of Annaka; Kazuyuki Suzuki, Gunma, all of Japan

[73] Assignee: Shin-Etsu Chemical Co., Ltd., Tokyo, Japan

[21] Appl. No.: 892,892

[22] Filed: Jun. 3, 1992

[30] Foreign Application Priority Data

Jun. 3, 1991 [JP] Japan ................... 3-159975

[51] Int. Cl.$^5$ ............................................. C08K 9/06
[52] U.S. Cl. ................................. 523/213; 523/209; 523/212; 524/588; 524/863; 528/17
[58] Field of Search ............ 528/17; 523/213, 212, 523/209; 524/588, 863

[56] References Cited

U.S. PATENT DOCUMENTS 4,670,532  6/1987  Lucas .................................. 528/17
4,687,829  8/1987  Chaffie et al. ........................ 528/17

FOREIGN PATENT DOCUMENTS 59-213760  12/1984  Japan .
61-34063    2/1986  Japan .

*Primary Examiner*—Melvyn I. Marquis
*Attorney, Agent, or Firm*—Lowe, Price, LeBlanc & Becker

[57] ABSTRACT

A room temperature vulcanizable organopolysiloxane composition comprises (A) a diorganopolysiloxane which is blocked with an alkoxy group at both ends of a molecular chain thereof, (B) a tri or tetraalkoxysilane, (C) a titanium curing catalyst, (D) a silica filler, and (E) an alkoxysilane which is less hydrolyzable than the alkoxysilane of (B). The composition yields a cured product having high strength and high elongation and is low in viscosity and extrusion rate. A method for preparing the composition is also provided in which the ingredients (A) to (D) are first mixed together, to which the ingredient (E) is added.

14 Claims, No Drawings

ROOM TEMPERATURE VULCANIZABLE ORGANOPOLYSILOXANE COMPOSITION AND METHOD FOR PRODUCING THE SAME

BACKGROUND OF THE INVENTION

1. Field of The Invention

This invention relates to a room temperature vulcanizable organopolysiloxane composition of the dealcohol type. The invention also relates to a method for producing the room temperature vulcanizable organopolysiloxane compound of the above-mentioned type.

2. Description of The Prior Art

As a room temperature vulcanizable organopolysiloxane composition of the dealcohol type, there is known a composition which comprises, as a base polymer, a diorganopolysiloxane which has a hydroxyl group at both ends. The RTV composition further comprises alkoxysilanes in order to block the terminal hydroxyl groups of the molecular chain of the diorganopolysiloxane therewith. This eventually leads to release of alcohols through reaction of the hydroxyl groups with the alkoxysilanes in the composition. However, the released alcohol presents the problem that the shelf life of the composition is considerably impeded. In order to eliminate the alcohol from the composition, it is usual to add scavengers reactive with the alcohol to the composition. The addition of the scavenger compound in turn raises other problems such as of the generation of offensive odor and/or the discoloration of the composition. It will be noted here that the dealcohol-type composition is intended to mean one which makes use of alkoxysilanes as a curing agent and wherein alcohols are released when the composition is cured or vulcanized.

To solve these problems, there have been proposed a number of compositions which comprise, as a base polymer, diorganopolysiloxanes which are blocked with an alkoxy group at both ends thereof. For instance, Japanese Laid-Open Patent Application No. 59-213760 describes a composition which comprises, aside from such a base polymer as mentioned above, a tin compound as a catalyst. Japanese Laid-Open Patent Application No. 61-34063 sets forth a composition which comprises a filler made of a major proportion of an extender filler such as calcium carbonate and a minor proportion of a reinforcing filler to obtain a low modulus type of composition. Moreover, Japanese Laid-Open Patent Application No. 59-213760 describes a composition which comprises a combination of a silane compound having functional groups other than alkoxy groups and an appropriate adhesion improver to improve the adhesiveness.

With high strength RTV organopolysiloxane compositions of the dealcohol type, they have been hitherto prepared by formulating large amounts of various types of reinforcing fillers. However, it has been difficult to impart to the composition a low viscosity and an improved extrusion rate. To cope with the difficulty, it becomes necessary to increase the amounts of ingredients such as a softener, a curing agent and the like. As a consequence, it is not inevitable that the elongation, strength and the like properties be lowered to a significant extent.

SUMMARY OF THE INVENTION

It is accordingly an object of the invention to provide a room temperature vulcanizable organopolysiloxane composition of the dealcohol type which is high in strength and elongation and has a low viscosity and a good extrusion rate.

It is another object of the invention to provide a method for producing a room temperature vulcanizable organopolysiloxane composition of the type mentioned above.

According to one embodiment of the invention, there is provided a room temperature vulcanizable organopolysiloxane composition which comprises:

(A) 100 parts by weight of a diorganopolysiloxane which is blocked with an alkoxy group at both ends of a molecular chain thereof;

(B) from 1 to 25 parts by weight of an alkoxysilane of the general formula, or a partial hydrolyzate thereof

$$R^1{}_{4-n}Si(OR^2)_n$$

wherein $R^1$ and $R^2$ may be the same or different and represent an unsubstituted or substituted monovalent hydrocarbon group, and n is a value of 3 or 4;

(C) from 0.01 to 10 parts by weight of a curing catalyst selected from the group consisting of titanic esters and titanium complex compounds;

(D) from 5 to 500 parts by weight of a silica filler; and (E) from 1 to 25 parts by weight of an alkoxysilane of the following general formula which is less hydrolyzable than the ingredient (B), or a partial hydrolyzate thereof

$$R^1{}_{4-m}Si(OR^2)_m$$

wherein $R^1$ and $R^2$ have, respectively, the same meaning as defined with respect to (B) and m is an integer of from 1 to 4.

According to another embodiment of the invention, there is also provided a method for preparing a room temperature vulcanizable organopolysiloxane composition which comprises uniformly mixing the ingredients (A) to (D) in a dry atmosphere which is substantially free of moisture for a time sufficient for the uniform mixing, adding the ingredient (E) to the mixture, and uniformly mixing the resultant mixture in a dry atmosphere which is substantially free of moisture. In this method, it is essential that the ingredient (B) which is more hydrolyzable than the ingredient (E) be mixed with other ingredients prior to mixing of the ingredient (E) for the reasons as will be discussed hereinafter.

DETAILED DESCRIPTION AND EMBODIMENTS OF THE INVENTION

The respective ingredients of the RTV organopolysiloxane composition according to the invention are initially described.

The ingredient (A) which is used as a base polymer of the composition of the invention is a diorganopolysiloxane which is blocked with an alkoxy group at both ends of the molecular chain of the diorganopolysiloxane. Useful diorganopolysiloxanes are, for example, of the following formula

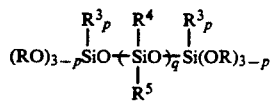

wherein each $R^3$, each $R^4$ and each $R^5$ may be the same or different and represent an unsubstituted or substituted monovalent hydrocarbon group having from 1 to 12 carbon atoms, preferably from 1 to 8 carbon atoms, each R represents an unsubstituted or substituted monovalent monohydrocarbon group as defined with respect to $R^3$ to $R^5$, p is a value of 0 to 2, and q is an integer of not smaller than 10, preferably from 50 to 2000.

Examples of the unsubstituted or substituted monovalent hydrocarbon groups represented by $R^3$ to $R^5$ in the above formula include alkyl groups having from 1 to 8 carbon atoms such as a methyl group, an ethyl group, a propyl group, a butyl group, a 2-ethylbutyl group, an octyl group and the like, cycloalkyl groups having from 3 to 6 carbon atoms such as a cyclohexyl group, a cyclopentyl group and the like, alkenyl groups having from 2 to 6 carbon atoms such as a vinyl group, an allyl group, a hexenyl group and the like, aryl groups having from 6 to 12 carbon atoms such as a phenyl group, a tolyl group, a xylyl group, a naphthyl group, a diphenyl group and the like, aralkyl groups having from 7 15 carbon atoms such as benzyl group, a phenylethyl group and the like, and those groups mentioned above but wherein part or all of the hydrogen atoms of the groups are substituted with a halogen atom such as F, Cl, Br or I, a cyano group or the like, e.g. a chloromethyl group, a trifluoropropyl group, a cyanoethyl group, a 3-cyanopropyl group and the like.

As stated above, R represents the monovalent hydrocarbon group as defined with respect to $R^3$ to $R^5$. The alkoxy groups, RO—, of the ingredient (A) and the alkoxy groups of the ingredient (B) described hereinafter are both hydrolyzed with moisture in air to form a vulcanized or cured product of a rubbery elastomer through condensation of the hydrolyzates. If the hydrolyzability of the alkoxy group, RO—, is low, the hydrolysis with moisture in air does not proceed quickly, so that the the curing proceeds only very slowly. To avoid this, R should preferably be a group with a relatively low molecular weight as having not larger than six carbon atoms. Most preferably, R is a lower alkyl group having 1 or 2 carbon atoms such as a methyl group or an ethyl group.

In the practice of the invention, both ends of the molecular chain of the diorganopolysiloxane have to be blocked with an alkoxy group, RO—, so that p is an integer of from 0 to 2. From the standpoint of the workability and rubbery elasticity and mechanical characteristics of a final cured product, the diorganopolysiloxane should have a viscosity at 25° C. of from 25 to 500,000 centistokes, preferably from 1,000 to 100,000 centistokes. To this end, q is an integer of not smaller than 10, preferably from 50 to 2000. Of course, in order to appropriately control the viscosity of the composition, two or more diorganopolysiloxanes having different viscosities may be used in combination.

The alkoxysilane or its partially hydrolyzed product of the ingredient (B) serves as a vulcanizing agent. This alkoxysilane is of the following general formula

$$R^1_{4-n}Si(OR^2)_n$$

wherein $R^1$ and $R^2$ may be the same or different and represent an unsubstituted or substituted monovalent hydrocarbon group, and n is a value of 3 or 4. The unsubstituted or substituted monovalent hydrocarbon groups include, for example, those groups defined with respect to $R^3$ to $R^5$ of the ingredient (A) provided that $R^2$ may be an alkoxy-substituted alkyl group such as a methoxyethyl group, an ethoxyethyl group or the like. With alkoxysilanes of the formula where n is a value of 1 or 2, they are undesirably lower in hydrolyzing property than alkoxysilanes of the formula where n is 3 or 4. This will lead to the problem that because blocking of the SiOH groups and the elimination of moisture cannot be effected to a satisfactory extent, the vulcanization or curing does not proceed satisfactorily and the shelf life is lowered.

Suitable examples of the alkoxysilanes used in the present invention include tetramethoxysilane, tetraethoxysilane, tetra-n-propoxysilane, tetraisopropoxysilane, methyltri(methoxy)silane, vinyltri(methoxy)silane, phenyltri(methoxy)silane, propyltri(methoxy)silane, methyltri(ethoxy)silane, vinyltri(ethoxy)silane, methyltri(propoxy)silane, vinyltri(propoxy)silane, 3-chloropropyltri(methoxy)silane, 3,3,3-trifluoropropyltri(methoxy)silane, methyltri(methoxyethoxy)silane and the like.

These alkoxysilanes are readily obtained by subjecting corresponding alcohols to dehydrochlorination reaction with halogenated silanes in an organic amine, used as an acid acceptor, such as triethylamine, dimethylaniline or the like.

In the practice of the invention, partially hydrolyzed products of the alkoxysilanes may be used. The partial hydrolysis may be effected by adding water to the alkoxysilanes and subjecting to hydrolysis with a base such as triethylamine to a hydrolysis rate of from 10 to 50%. The hydrolyzates may have a linear, cyclic or branched structure.

The ingredient (B) is used in an amount of from 1 to 25 parts, preferably from 3 to 10 parts by weight, per 100 parts by weight of the ingredient (A). If the amount is less than 1 part by weight, gelation may take place during the preparation or storage of the composition. Alternatively, physical properties of a cured product from the composition may lower. If the amount exceeds 25 parts by weight, the shrinking rate at the time of curing of the composition becomes so great that the elasticity of the resultant cured product undesirably lowers.

The ingredient (C) of the composition is a curing catalyst. For this purpose, there is used at least one selected from titanic esters and titanium complex compounds. Examples of the titanic esters include tetrapropyl titanate, tetrabutyl titanate, tetra-2-ethylhexyl titanate, tetraethyl titanate, tetra(isopropyloxy) titanate and the like. Examples of the titanium complex compound include triethanolamine titanate, dimethoxytitanium diacetylacetonate, diethoxytitanium diacetylacetonate and the like.

The curing catalyst is used in an amount of from 0.01 to 10 parts by weight, preferably from 1 to 3 parts by weight, per 100 parts by weight of the ingredient (A). If the amount is less than 0.01 part by weight, it takes a long time before formation of a tack-free film in the case where the composition is cured while exposing to air. In addition, the curability in the inside of the composition becomes worsened. When the amounts exceeds 10 parts by weight, the curing of the composition in the form of films or the like is accomplished within a very short time of several seconds, thus presenting the problem on working conditions. Moreover, the shelf life of an uncured composition is undesirably shortened.

It will be noted that the curing catalyst ordinarily used for this type of RTV composition is an organic tin compound. If an organic tin compound is used in the composition of the invention, the resultant cured product is lowered in heat resistance and suffers discoloration in relation to the time. Thus, the use of organic tin compounds in the composition is not beneficial in the practice of the invention.

The silica filler used as the ingredient (D) is a so-called reinforcing filler which is used to improve mechanical characteristics, such as strength, of cured products. Such silica fillers include, for example, finely divided silica such as dry process silica, wet process silica, calcined silica or the like, silica aerogel, precipitated silica, fused silica and the like. These fillers may be surface treated with organochlorosilanes, polyorganosilanes, organosilazanes or the like.

These silica fillers are used in an amount of from 1 to 500 parts by weight, preferably from 10 to 100 parts by weight, per 100 parts by weight of the ingredient (A). If the amount is less than 1 part by weight, the physical properties such as strength of the cured composition are not significantly improved, thereby not achieving the purposes of obtaining the high strength and high elongation composition. If the amount exceeds 500 parts by weight, the resultant composition becomes very viscous with a considerable lowering of the extrusion rate. This results in very poor workability.

The alkoxysilane is used as the ingredient (E) in the composition of the invention. This alkoxysilane (E) should be lower in hydrolyzability than the alkoxysilane used as the vulcanizing ingredient (B) and may be a so-called reactive diluent. More particularly, the alkoxysilane of the ingredient (B) is effective in blocking the SiOH groups in the base ingredient (A) and eliminating moisture from the composition. On the other hand, the alkoxysilane of the ingredient (E) is gradually hydrolyzed after reaction of the ingredient (B) with moisture in air at the time of curing to form a three-dimensional network structure, and is passed into the three-dimensional network structure. By the passage into the network structure, the three-dimensional network structure of a final cured product becomes less defective, thereby achieving high strength of the final product.

The alkoxysilane of the ingredient (E) should be less hydrolyzable than the alkoxysilane of the ingredient (B) and is one represented by the following general formula

$$R^1_{4-m}Si(OR^2)_m$$

wherein $R^1$ and $R^2$ are independently those groups defined with respect to the alkoxysilane of the ingredient (B) and m is an integer of from 1 to 4. Specific examples include tetramethoxysilane, tetraethoxysilane, tetra-propoxysilane, tetraiso-propoxysilane, methyltri(methoxy)silane, vinyltri(methoxy)silane, phenyltri(methoxy)silane, propyltri(methoxy)silane, methyltri(ethoxy)silane, vinyltri(ethoxy)silane, methyltri(propoxy)silane, vinyltri(ethoxy)silane, 3-chloropropyltri(methoxy)silane, 3,3,3-trifluoropropyltri(methoxy)silane, dimethyldimethoxysilane, diethyldimethoxysilane, dimethyldiethoxysilane, diethyldiethoxysilane, trimethylmethoxysilane, trimethylethoxysilane, triethylmethoxysilane, triethylethoxysilane, and the like. It will be noted that although the same alkoxysilanes are mentioned as the ingredient (B) and also as the ingredient (E), these alkoxysilanes are properly used for the respective ingredients to satisfy the condition that the ingredient (E) is less hydrolyzable than the ingredient (B).

The comparison of the hydrolyzability with that of the alkoxysilane of the ingredient (B) is made by a procedure wherein a conversion rate in the reaction, for example, with trimethylsilanol is traced according to the gas chromatography using decane as an internal standard, from which the reaction velocities of the respective alkoxysilanes are compared with each other. In general, an alkoxysilane having a smaller number of alkoxy groups is lower in the hydrolyzability than an alkoxysilane with a larger number of alkoxy groups. For the same number of alkoxy groups, an alkoxysilane which has the alkoxy groups having a larger number of carbon atoms is less hydrolyzable than an alkoxysilane which have the alkoxy groups having a smaller number of carbon atoms.

For instance, when vinyltrimethoxysilane is used as the ingredient (B), there are preferably used as the ingredient (E) vinyltriethoxysilane, dimethyldimethoxysilane, dimethyldiethoxysilane, trimethylmethoxysilane and phenyltriethoxysilane.

These alkoxysilanes are obtainable by a similar process as with the alkoxysilanes of the ingredient (B). Like the ingredient (B), partial hydrolyzates of the alkoxysilanes of the ingredient (E) may also be used instead of the alkoxysilane. These partial hydrolyzates may have a linear, cyclic or branched structure.

The ingredient (E) is used in an amount of from 1 to 25 parts by weight, preferably from 5 to 10 parts by weight, per 100 parts by weight of the ingredient (A). If the amount is less than one part by weight, the resultant composition is not improved in the extrusion rate and does not become low in viscosity. On the other hand, when the amount exceeds 25 parts by weight, the resultant composition is shrunk to a great extent when cured, coupled with the disadvantage that the elasticity of the cured product is lowered. It is preferred that the ingredient (E) is used in amounts greater than the ingredient (B).

The composition of the invention may further comprise, aside from the ingredient (A) to various additives which are ordinarily added to this type of composition. For instance, there may be added reinforcing agents such as titanium oxide, aluminium oxide, quartz powder, talc, bentonite and the like, fibrous fillers such as glass fibers, organic fibers and the like, colorants, heat resistance improvers such as red oxide, cerium oxide and the like, cold resistance improvers, thixotropic agents such as polyethers, dehydrators, adhesion improvers such as τ-glycidoxypropyltrimethoxysilane and the like, and softeners such as dialkylpolysiloxanes whose terminal ends are blocked with a trialkyl group. If used, these additives are added in amounts not impeding the inherent characteristics of the composition.

The preparation of the composition according to the invention is described. First, the ingredients (A) to (D) are mixed together in amounts defined before in a dry atmosphere to obtain a uniform mixture. The term "dry atmosphere" is intended to mean an atmosphere in which moisture is not substantially present. For instance, the mixing is effected under reduced pressure conditions of from 50 to $1 \times 10^{-1}$ Torr., or in a n atmosphere of a dried inert gas such as $N_2$, Ar and the like. By the mixing in this type of atmosphere, the mixture is effectively suppressed from undergoing curing at the preparation of the composition. This first stage mixing is generally continued for 10 to 30 minutes until the respective ingredients are uniformly mixed, during which the SiOH groups in the starting materials are appropriately blocked and, if present, the moisture left in the starting materials would be substantially eliminated.

Then, the ingredient (E) is added to the thus obtained uniform mixture to obtain a composition of the invention. This second stage mixing is also effected in a dry atmosphere. This ingredient (E) serves as a kind of diluent to make the composition low in viscosity and to improve the extrusion rate.

In the method of the invention, it is very important that the ingredient (B), which is more likely to hydrolyze than the ingredient (E), be added in the first mixing stage. If both ingredients (B) and (E) are added at the same time or the order of the addition of the ingredients (B) and (E) is reversed, part of the SiOH groups of the ingredient (A) is blocked with the ingredient (E) with a lower hydrolyzability. When part of the SiOH groups is blocked with the less reactive ingredient, the curability of the composition is disadvantageously lowered. On the contrary, when the less hydrolyzable ingredient (E) is added after mixing of the ingredients (A) to (D) according to the invention, it is effectively prevented that the SiOH groups are blocked with the less reactive ingredient (E), thus the above disadvantages being effectively avoided.

In the method of the invention, arbitrary additives other than the ingredients (A) to (E) may be added in or during the first stage mixing or the second stage mixing.

The first and second stage mixings are generally effected at a temperature of from 20° to 80° C. by means of kneaders, rolls, mixers, extruders or the like.

The thus obtained composition of the invention is vulcanized or cured at room temperature with the aid of moisture in air to form a cured product with a rubbery elastomer.

As will become apparent from examples appearing hereinafter, the composition is low in viscosity and has a high extrusion rate and can yield a cured product which has good mechanical characteristics such as strength, elongation and the like. Thus, the composition has utility in the fields of electric and electronic industries for use as coatings, adhesives and the like. In addition, because the composition is low in toxicity and odor, it may be conveniently used in the fields of medical service and foods.

The present invention is more particularly described by way of examples, in which parts are by weight and the viscosity is a measurement determined at 25° C. Comparative examples are also shown.

COMPARATIVE EXAMPLE 1

| | |
|---|---|
| Dimethylpolysiloxane blocked with a trimethoxysilyl group at both ends of the molecular chain (viscosity: 2,000 centistokes) | 100 parts |
| Dimethylpolysiloxane blocked with a trimethylsilyl group at both ends of the molecular chain (viscosity: 100 centistokes) | 8 parts |
| Aerosol silica | 20 parts |
| Vinyltrimethoxysilane | 3 parts |
| Tetrapropoxy titanium | 1 part |

The ingredients of the above formulation were mixed in a moisture-free condition to provide sample (a).

A 2.0 mm thick sheet was made using the sample (a) and allowed to stand under conditions of 20° C. and 50% R. H. for seven days to obtain a cured rubbery elastomer product. This cured product was subjected to measurements of physical properties including hardness, elongation and tensile strength according to the methods prescribed in JIS K 6301.

It will be noted that the hardness was measured by the use of a hardness A spring tester prescribed in JIS K 6301.

In addition, the sample (a) was filled in a cartridge and discharged from a nozzle with a diameter of 3 mm under conditions of a temperature of 200° C. and an air pressure of 5.6 kgf/cm$^2$ for 1 minute to determine a flow or extrusion rate. The results are shown in Table 1.

EXAMPLE 1

| | |
|---|---|
| Dimethylpolysiloxane blocked with a trimethoxysilyl group at both ends of the molecular chain (viscosity: 20,000 centistokes) | 100 parts |
| Dimethylpolysiloxane blocked with a trimethylsilyl group at both ends of the molecular chain (viscosity: 100 centistokes) | 8 parts |
| Aerosol silica | 20 parts |
| Vinyltrimethoxysilane | 3 parts |
| Tetrapropoxy titanium | 1 part |

The ingredients of the above formulation were uniformly mixed in a water-free condition, after which 5 parts of vinyltriethoxysilane was uniformly mixed to obtain sample (b).

The sample (b) was subjected to measurements of the physical properties and the extrusion rate in the same manner as in Comparative Example 1. The results are shown in Table 1.

EXAMPLE 2

| | |
|---|---|
| Dimethylpolysiloxane blocked with a trimethoxysilyl group at both ends of the molecular chain (viscosity: 20,000 centistokes) | 100 parts |
| Dimethylpolysiloxane blocked with a trimethylsilyl group at both ends of the molecular chain (viscosity: 100 centistokes) | 8 parts |
| Aerosol silica | 0 parts |
| Vinyltrimethoxysilane | 3 parts |
| Tetrapropoxy titanium | 1 part |

The ingredients of the above formulation were uniformly mixed in a moisture-free condition, after which 5 parts of dimethylmethoxysilane was uniformly mixed to obtain sample (c).

The sample (c) was subjected to measurements of the physical properties and the extrusion rate in the same manner as in Comparative Example 1. The results are shown in Table 1.

TABLE 1

| | Sample (a) of Comp. Example 1 | Sample (b) of Example 1 | Sample (c) of Example 2 |
|---|---|---|---|
| Initial Physical Properties: | | | |
| Hardness | 27 | 40 | 37 |
| Elongation (%) | 430 | 640 | 570 |
| Tensile Strength (kgf/cm$^2$) | 33 | 56 | 55 |
| Extrusion rate (g/minute) | 108 | 400 | 320 |

COMPARATIVE EXAMPLE 2

| | |
|---|---|
| Dimethylpolysiloxane blocked with a trimethoxysilyl group at both ends of the molecular chain (viscosity: 900 centistokes) | 80 parts |

| | |
|---|---|
| Aerosol silica | 12 parts |

The ingredients of the above formulation were mixed under reduced pressure at 150° C. for 2 hours, followed by cooling down to room temperature in a dry nitrogen atmosphere. To the mixture were further added 3 parts of vinyltrimethoxysilane and 1 part of tetrapropoxy titanium in a moisture-free condition to obtain sample (d).

The sample was subjected to measurements of physical properties in the same manner as in Comparative Example 1. The viscosity at 25° C. prior to curing was measured by the use of the BH-type rotary viscometer. The results are shown in Table 2.

EXAMPLE 3

| | |
|---|---|
| Dimethylpolysiloxane blocked with a trimethoxysilyl group at both ends of the molecular chain (viscosity: 900 centistokes) | 80 parts |
| Aerosol silica | 12 parts |

The ingredients of the above formulation was mixed under reduced pressure at 150° C. for 2 hours, followed by cooling down to room temperature in a dry nitrogen atmosphere. To the mixture were further added 3 parts of vinyltrimethoxysilane and 1 part of tetrapropoxy titanium in a moisture-free condition, followed by further addition of 5 parts of vinyltriethoxysilane to obtain sample (e).

The sample was subjected to measurements of physical properties and the viscosity prior to the curing in the same manner as in Comparative Example 2. The results are shown in Table 2.

TABLE 2

| | Sample (d) Comp. Ex. 2 | Sample (e) of Example 3 |
|---|---|---|
| Viscosity (poises) | 430 | 102 |
| Hardness | 40 | 38 |
| Elongation (%) | 140 | 280 |
| Tensile Strength (kgf/cm$^2$) | 10 | 30 |

COMPARATIVE EXAMPLE 3

| | |
|---|---|
| Dimethylpolysiloxane blocked with a trimethoxysilyl group at both ends of the molecular chain (viscosity: 20,000 centistokes) | 100 parts |
| Dimethylpolysiloxane blocked with a trimethylsilyl group at both ends of the molecular chain (viscosity: 100 centistokes) | 8 parts |
| Aerosol silica | 20 parts |
| Vinyltrimethoxysilane | 20 parts |
| Tetrapropoxy titanium | 1 part |

The ingredients of the above formulation were mixed in a moisture-free condition to obtain sample (f).

The sample (f) was subjected to measurements of the physical properties and the extrusion rate in the same manner as in Comparative Example 1. The results are shown in Table 3.

EXAMPLE 4

| | |
|---|---|
| Dimethylpolysiloxane blocked with a trimethoxysilyl group at both ends of the molecular chain (viscosity: 20,000 centistokes) | 100 parts |
| Dimethylpolysiloxane blocked with a trimethylsilyl group at both ends of the molecular chain (viscosity: 100 centistokes | 8 parts |
| Aerosol silica | 20 parts |
| Vinyltrimethoxysilane | 5 parts |
| Tetrapropoxy titanium | 1 part |

The ingredients of the above formulation were uniformly mixed in a moisture-free condition, after which 15 parts of phenyltriethoxysilane was uniformly mixed to obtain sample (g).

The sample (g) was subjected to measurements of the physical properties and the extrusion rate in the same manner as in Comparative Example 1. The results are shown in Table 3.

TABLE 1

| | Sample (a) of Com. Example 3 | Sample (b) of Example 4 |
|---|---|---|
| Initial Physical Properties: | | |
| Hardness | 28 | 34 |
| Elongation (%) | 100 | 410 |
| Tensile Strength (kgf/cm$^2$) | 10 | 42 |
| Flow Rate (g/minute) | 590 | 610 |

As will be apparent from the above examples, the composition of the invention is able to yield a cured product having high strength and high elongation and is low in viscosity with a good extrusion rate.

What is claimed is:

1. A room temperature vulcanizable organopolysiloxane composition which comprises:
   (A) 100 parts by weight of at least one diorganopolysiloxane which is blocked with at least one alkoxy group at both ends of a molecular chain thereof;
   (B) from 1 to 25 parts by weight of a first alkoxysilane of the general formula, or a partial hydrolyzate thereof, $$R^1{}_{4-n}Si(OR^2)_n$$

wherein $R^1$ and $R^2$ may be the same or different and represent an unsubstituted or substituted monovalent hydrocarbon group, and n is 3 or 4, said first alkoxysilane having a first hydrolyzing property;
   (C) from 0.01 to 10 parts by weight of a curing catalyst selected from the group consisting of titanic esters and titanium complex compounds;
   (D) from 5 to 500 parts by weight of a silica filler; and
   (E) from 1 to 25 parts by weight of a second alkoxysilane of the following general formula, or a partial hydrolyzate thereof, $$R^1{}_{4-m}Si(OR^2)_m$$

wherein $R^1$ and $R^2$ have, respectively, the same meanings as defined with respect to (B) and m is an integer of from 1 to 4, said second alkoxysilane having a second hydrolyzing property, the first and second hydrolyzing properties being such that the second alkoxysilane is less hydrolyzable than the first alkoxysilane,
   said room temperature vulcanizable organopolysiloxane composition being prepared by first mixing components (A)–(D) and then adding component (E) to the resulting mixture.

2. The room temperature vulcanizable organopolysiloxane composition according to claim 1, wherein said diorganopolysiloxane is of the following general formula

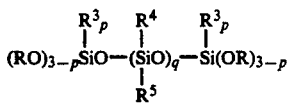

wherein each $R^3$, each $R^4$ and each $R^5$ may be the same or different and represent an unsubstituted or substituted monovalent hydrocarbon group having from 1 to 12 carbon atoms, each R represents an unsubstituted or substituted monovalent monohydrocarbon group as defined with respect to $R^3$ to $R^5$, p is a value of 0 to 2, and q is an integer of not smaller than 10.

3. The room temperature vulcanizable organopolysiloxane composition according to claim 2, wherein each R represents a lower alkyl group having 1 to 2 carbon atom.

4. The room temperature vulcanizable organopolysiloxane composition according to claim 1, wherein said diorganopolysiloxane has a viscosity at 25° C. of from 25 to 500,000 centistokes.

5. The room temperature vulcanizable organopolysiloxane composition according to claim 1, comprising a mixture of diorganopolysiloxanes having different viscosities.

6. The room temperature vulcanizable organopolysiloxane composition according to claim 1, wherein the ingredient (B) is the alkoxysilane.

7. The room temperature vulcanizable organopolysiloxane composition according to claim 1, wherein the ingredient (B) is a partial hydrolyzate of the alkoxysilane.

8. The room temperature vulcanizable organopolysiloxane composition according to claim 1, wherein the ingredient (C) is a titanic ester.

9. The room temperature vulcanizable organopolysiloxane composition according to claim 1, wherein the ingredient (C) is a titanium complex compound.

10. The room temperature vulcanizable organopolysiloxane composition according to claim 1, wherein said silica filler is surface treated with a member selected from organochlorosilanes, polyorganosilanes and organosilazanes.

11. The room temperature vulcanizable organopolysiloxane composition according to claim 1, wherein said alkoxysilane of the ingredient (E) is present in an amount larger than said alkoxysilane of the ingredient (B) within the defined range of the amount.

12. A cured product of the composition in claim 1.

13. A method for preparing a room temperature vulcanizable organopolysiloxane composition which comprises:

mixing, in a dry atmosphere which is substantially free of moisture, (A) 100 parts by weight of at least one diorganopolysiloxane which is blocked with at least one alkoxy group at both ends of a molecular chain thereof, (B) from 1 to 25 parts by weight of a first alkoxysilane of the general formula, or a partial hydrolyzate thereof,

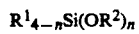

wherein $R^1$ and $R^2$ may be the same or different and represent an unsubstituted or substituted monovalent hydrocarbon group, and n is 3 or 4, said first alkoxysilane having a first hydrolyzing property, (C) from 0.01 to 10 parts by weight of a curing catalyst selected from the group consisting of titanic esters and titanium complex compounds; and (D) from 5 to 500 parts by weight of a silica filler until a uniform mixture is obtained; and adding from 1 to 25 parts by weight of a second alkoxysilane of the following general formula, or a partial hydrolyzate thereof,

wherein $R^1$ and $R^2$ have, respectively, the same meanings as defined with respect to (B) and m is an integer of from 1 to 4, to the resultant mixture for uniform mixing in a dry atmosphere which is substantially free of moisture, said second alkoxysilane having a second hydrolyzing property, the first and second hydrolyzing properties being such that the second alkoxysilane is less hydrolyzable than the first alkoxysilane.

14. The method according to claim 13, wherein the mixing of the ingredients (A) to (D) is continued for 10 to 30 minutes.

* * * * *